United States Patent
Xu et al.

(10) Patent No.: US 10,598,866 B2
(45) Date of Patent: Mar. 24, 2020

(54) LOW REFLECTION FIBER-OPTIC CONNECTOR

(71) Applicant: LumaSense Technologies Holdings, Inc., Santa Clara, CA (US)

(72) Inventors: Juncheng Xu, Santa Clara, CA (US); Terry M. Stapleton, Santa Clara, CA (US)

(73) Assignee: LumaSense Technologies Holdings, Inc., Santa Clara, CA (US)

( * ) Notice: Subject to any disclaimer, the term of this patent is extended or adjusted under 35 U.S.C. 154(b) by 135 days.

(21) Appl. No.: 14/944,660

(22) Filed: Nov. 18, 2015

(65) Prior Publication Data

US 2017/0139149 A1    May 18, 2017

(51) Int. Cl.
*G02B 6/38* (2006.01)
*G02B 6/42* (2006.01)

(52) U.S. Cl.
CPC ........... *G02B 6/3818* (2013.01); *G02B 6/382* (2013.01); *G02B 6/3817* (2013.01); *G02B 6/3861* (2013.01); *G02B 6/3863* (2013.01); *G02B 6/4207* (2013.01)

(58) Field of Classification Search
CPC .. G02B 6/3818; G02B 6/3861; G02B 6/3863; G02B 6/3845; G02B 6/3847; G02B 6/243; G02B 2006/12126
See application file for complete search history.

(56) References Cited

U.S. PATENT DOCUMENTS

| 3,861,781 A | * | 1/1975 | Hasegawa | G02B 6/3855 385/60 |
| 4,023,886 A | * | 5/1977 | Nakayama | G02B 6/3834 385/78 |
| 4,133,601 A | * | 1/1979 | Le Guen | G02B 6/3834 385/80 |
| 4,185,883 A | * | 1/1980 | Chown | G02B 6/3835 385/38 |
| 4,303,304 A | * | 12/1981 | Ruiz | G02B 6/3834 264/1.28 |
| 4,383,732 A | * | 5/1983 | Dalgoutte | G02B 6/3835 385/78 |
| 4,634,214 A | * | 1/1987 | Cannon, Jr. | G02B 6/3818 385/80 |

(Continued)

FOREIGN PATENT DOCUMENTS

| JP | 59099408 A | * | 6/1984 | .......... G02B 6/3861 |
| JP | 07-56070 A | * | 3/1995 | |

(Continued)

OTHER PUBLICATIONS

International Search Report and Written Opinion issued in International Application No. PCT/US2016/061242; dated Dec. 22, 2016, (13 pages).

(Continued)

*Primary Examiner* — Rhonda S Peace
(74) *Attorney, Agent, or Firm* — Osha Liang LLP

(57) ABSTRACT

A low-reflection fiber-optic connector. The fiber-optic connector includes a ferrule that includes a fiber passage and an optical fiber traversing the fiber passage. The optical fiber includes a polished fiber end that is substantially flush with a ferrule end face. The ferrule end face, in an area surrounding the polished fiber end, is modified to reduce an optical reflectivity.

5 Claims, 7 Drawing Sheets

(56) References Cited

U.S. PATENT DOCUMENTS

| | | | | |
|---|---|---|---|---|
| 4,707,071 A | * | 11/1987 | Kraft | G02B 6/3818 385/60 |
| 4,984,865 A | * | 1/1991 | Lee | G02B 6/3861 156/322 |
| 5,081,694 A | * | 1/1992 | Rhoese | A61B 18/22 385/53 |
| 5,097,522 A | * | 3/1992 | Tackett | G02B 6/2552 385/53 |
| 5,179,610 A | * | 1/1993 | Milburn | G02B 6/3813 385/147 |
| 5,546,486 A | * | 8/1996 | Shih | G02B 6/241 216/24 |
| 5,596,210 A | * | 1/1997 | Konishi | G02B 6/4212 257/116 |
| 5,631,986 A | * | 5/1997 | Frey | G02B 6/3821 385/60 |
| 5,668,902 A | * | 9/1997 | Kurata | B24B 19/226 125/13.01 |
| 5,737,471 A | * | 4/1998 | Sugiyama | G02B 6/02033 385/123 |
| 5,778,125 A | * | 7/1998 | Busse | G02B 6/3807 385/139 |
| 5,859,944 A | * | 1/1999 | Inoue | G02B 6/021 385/37 |
| 6,310,997 B1 | * | 10/2001 | Kato | G02B 6/02171 385/31 |
| 6,419,401 B1 | * | 7/2002 | Taira | G02B 6/381 385/55 |
| 6,565,265 B2 | * | 5/2003 | Ohtsuka | G02B 6/25 385/60 |
| 6,883,975 B2 | * | 4/2005 | Clarkin | C03B 23/047 385/78 |
| 6,895,654 B2 | * | 5/2005 | Strandberg | G02B 6/3812 29/33 F |
| 6,898,219 B2 | * | 5/2005 | Malone | G02B 6/4212 372/101 |
| 6,948,862 B2 | * | 9/2005 | Brown | G02B 6/3813 385/78 |
| 6,960,027 B1 | * | 11/2005 | Krah | G02B 6/3855 385/78 |
| 7,027,705 B2 | * | 4/2006 | Onosato | G02B 6/4248 385/135 |
| 7,090,411 B2 | * | 8/2006 | Brown | G02B 6/4296 385/78 |
| 7,418,174 B2 | * | 8/2008 | Hirose | C03C 25/105 385/49 |
| 7,600,924 B2 | * | 10/2009 | Hama | G02B 6/4298 385/58 |
| 8,142,082 B2 | | 3/2012 | Oshima et al. | |
| 8,511,909 B2 | | 8/2013 | Kadar-Kallen et al. | |
| 8,568,039 B2 | * | 10/2013 | Owen, III | G02B 6/3818 385/60 |
| 9,110,246 B2 | * | 8/2015 | Berishev | G02B 6/32 |
| 9,588,303 B2 | * | 3/2017 | Danley | G02B 6/3833 |
| 9,810,853 B2 | * | 11/2017 | Kondo | G02B 6/3825 |
| 9,835,805 B2 | * | 12/2017 | Danley | G02B 6/3833 |
| 2001/0017971 A1 | | 8/2001 | Iwata | G02B 6/241 385/139 |
| 2002/0110332 A1 | * | 8/2002 | Clarkin | C03B 23/047 385/78 |
| 2002/0131699 A1 | * | 9/2002 | Raguin | G02B 6/322 385/33 |
| 2003/0009869 A1 | * | 1/2003 | Strandberg | G02B 6/3812 29/407.01 |
| 2009/0202201 A1 | * | 8/2009 | Scofet | G02B 6/4206 385/27 |
| 2010/0302530 A1 | * | 12/2010 | Liu | G02B 6/3861 356/73.1 |
| 2011/0103746 A1 | * | 5/2011 | Shacklette | G02B 6/138 385/60 |
| 2011/0317959 A1 | | 12/2011 | Ohta et al. | |
| 2012/0026749 A1 | * | 2/2012 | Armstrong | G02B 6/243 362/553 |
| 2013/0163930 A1 | | 6/2013 | Jian | |
| 2014/0347874 A1 | * | 11/2014 | Nakaya | G02B 6/0008 362/510 |
| 2015/0198771 A1 | | 7/2015 | Nakama et al. | |
| 2015/0362679 A1 | * | 12/2015 | Wu | B32B 37/1292 156/272.8 |
| 2016/0041347 A1 | * | 2/2016 | Hodge | G02B 6/3854 385/84 |
| 2016/0062054 A1 | * | 3/2016 | Danley | G02B 6/3833 385/77 |
| 2016/0264460 A1 | * | 9/2016 | Kufner | C03C 25/1063 |
| 2017/0139149 A1 | * | 5/2017 | Xu | G02B 6/3817 |

FOREIGN PATENT DOCUMENTS

| | | | |
|---|---|---|---|
| JP | H07-56070 A | | 3/1995 |
| JP | H09-269435 A | | 10/1997 |
| JP | 2005-70162 A | | 3/2005 |
| JP | 2014134578 A | * | 7/2014 |
| WO | 01/35140 A1 | | 5/2001 |

OTHER PUBLICATIONS

Office Action issued in corresponding Japanese Application No. 2018-525644 dated May 21, 2019, and English translation thereof (12 pages).

* cited by examiner

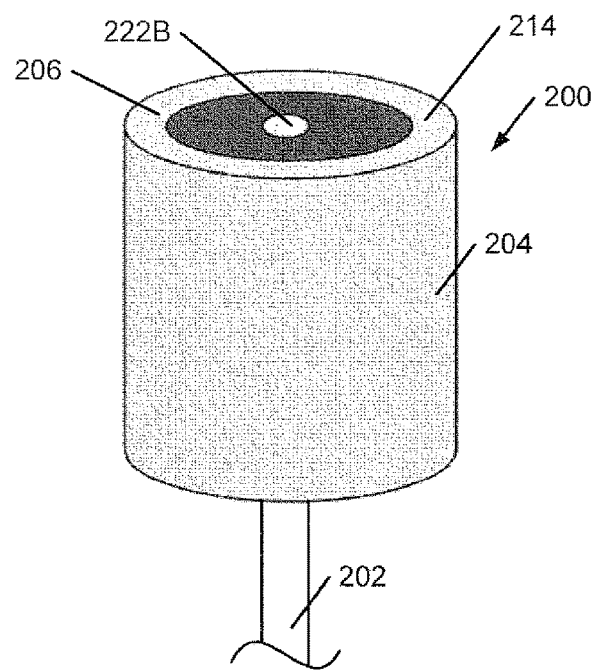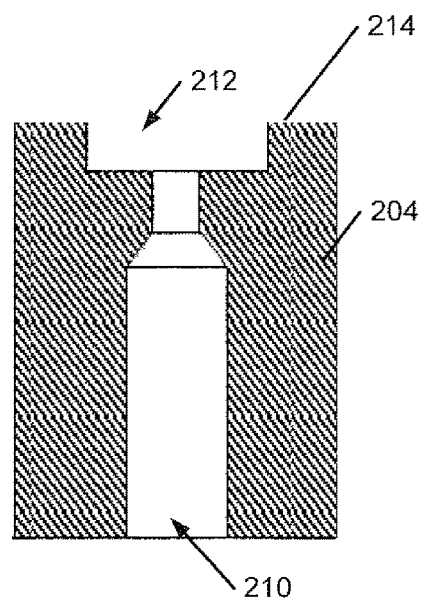
FIG. 2A
FIG. 2B
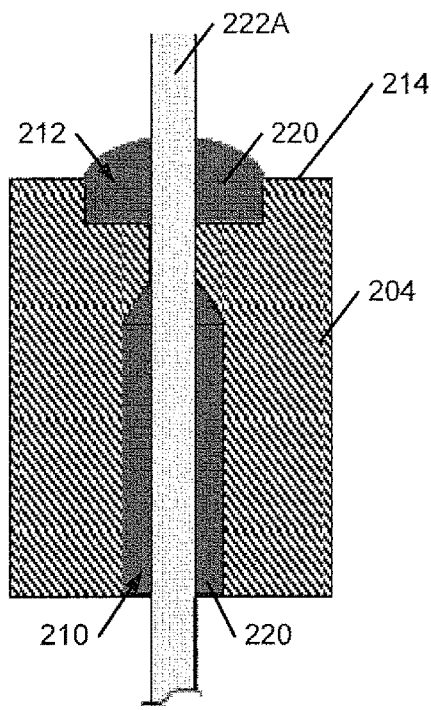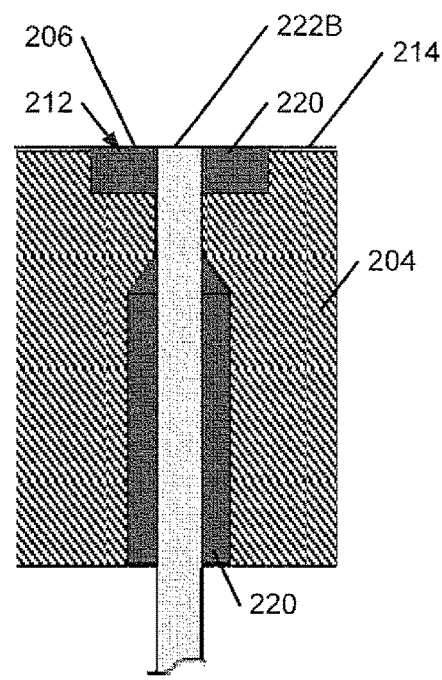
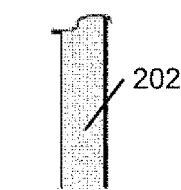
FIG. 2C
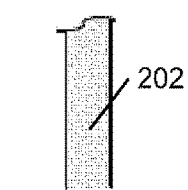
FIG. 2D

LOW REFLECTION FIBER-OPTIC CONNECTOR

BACKGROUND

Fiber-optic connectors may be used to connect optical fibers to optical components such as other optical fibers, light sources, sensors, etc. A ferrule may hold the fiber end of an optical fiber, thus aligning the fiber end with the optical elements interfacing with the optical fiber, and further providing a means for mechanical connection, and/or for protecting the optical fiber.

SUMMARY

In general, in one aspect, the invention relates to a fiber-optic connector. The fiber-optic connector includes a ferrule that includes a fiber passage and an optical fiber traversing the fiber passage. The optical fiber includes a polished fiber end that is substantially flush with a ferrule end face. The ferrule end face, in an area surrounding the polished fiber end, is modified to reduce an optical reflectivity.

In general, in one aspect, the invention relates to a method for manufacturing a fiber-optic connector. The method includes injecting an adhesive into a fiber passage and a recess of a ferrule of the fiber-optic connector. The recess is located in a ferrule end face, spanning an area surrounding a region where a polished fiber end of an optical fiber is to be located. The method further includes inserting the optical fiber into the fiber passage. After insertion of the optical fiber, an unpolished fiber end of the optical fiber protrudes beyond the ferrule end face. The method also includes, after curing of the adhesive: polishing the unpolished fiber end. The polishing transforms the unpolished fiber end into the polished fiber end and levels the adhesive with the ferrule end face and the polished fiber end.

In general, in one aspect, the invention relates to a method for manufacturing a fiber-optic connector. The method includes applying a coating that includes a photosensitive dye to a ferrule end face of a ferrule of the optical connector. The optical connector includes an optical fiber terminating in a polished fiber end, at the ferrule end face. The method further includes, locally, in the region of the polished fiber end, exposing the coating to light. The light is applied from a second end of the optical fiber and the light, locally, in the region of the polished fiber end, dissolves the coating.

BRIEF DESCRIPTION OF DRAWINGS

FIG. 2A shows a perspective view of a fiber-optic connector in accordance with one or more embodiments of the invention.

FIGS. 2B and 2C show cross-sectional views of partially manufactured fiber-optic connectors in accordance with one or more embodiments of the invention.

FIG. 2D shows a cross-sectional view of a fiber-optic connector in accordance with one or more embodiments of the invention.

DETAILED DESCRIPTION

Figure 1:
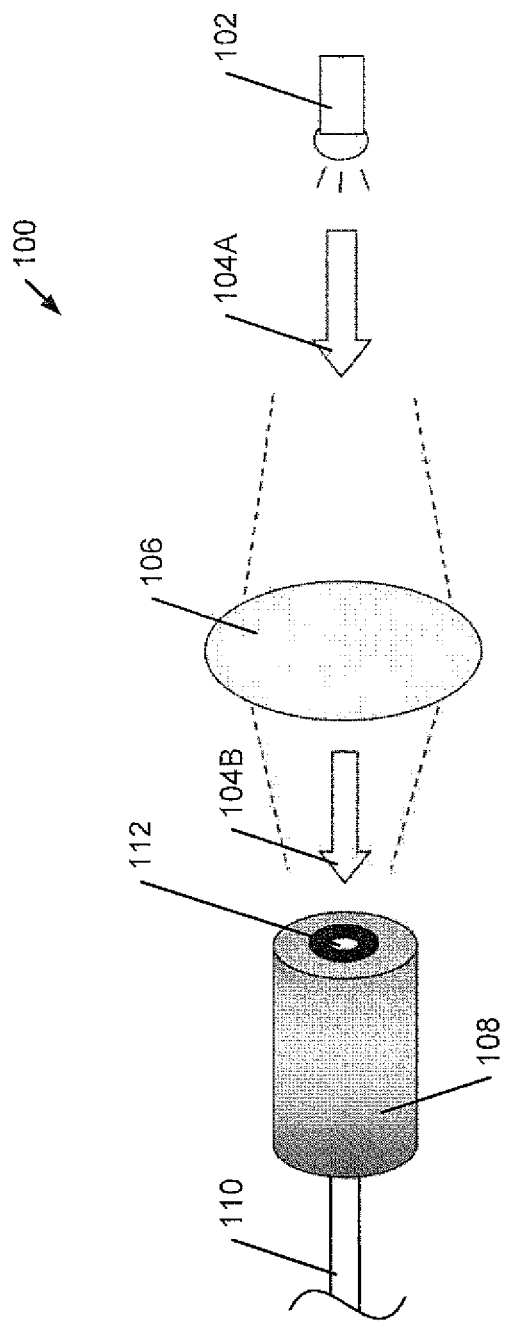
FIG. 1 shows a fiber-optic system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to fiber-optic connectors and methods for manufacturing fiber-optic connectors. A fiber-optic connector may be used in fiber-optic systems to connect an optical fiber to an interfacing optical component, such as for example, another optical fiber, a light source, an optical detector, etc. A fiber-optic connector, in accordance with one or more embodiments of the invention, may include a ferrule that holds a fiber end of the optical fiber. The ferrule may enclose the optical fiber in a manner such that the fiber end is aligned with another optical element, interfacing with the optical fiber. In one or more embodiments of the invention, the alignment reduces losses of light at the interface between the optical fiber and the other optical element.

In a configuration where the fiber end, held by the ferrule, receives light from an interfacing optical component, misalignments between the optical fiber at the fiber end and the interfacing component may result in light being directed not only to the receiving fiber end, but also to areas surrounding the fiber end. Accordingly, the surface of the ferrule, surrounding the fiber end, may be exposed to light received from the interfacing optical component. Such misalignments may not be entirely preventable and may even occur when a fiber-optic connector is properly installed. An additional cause for exposing the surface of the ferrule to light may be insufficiently focused light that therefore illuminates an area large than the fiber end.

If the surface of the ferrule, being exposed to received light, is optically reflective, light may be reflected back toward the interfacing optical component and may cause interference, e.g., with optically performed measurements, data transmissions, etc. The surface of the ferrule, in areas surrounding the fiber end, in accordance with one or more embodiments of the invention, is therefore modified to have a reduced optical reflectivity, thus reducing reflections of light toward the interfacing optical component.

FIG. 1 shows a schematic view of a fiber-optic system. The fiber-optic system (100), in accordance with one or more embodiments of the invention, includes a light source (102), a lens (106), a fiber-optic connector (108) and an optical fiber (110), with the fiber-optic connector terminating the optical fiber at the fiber end (112). Each of these components is described below.

The light source (102) may be any type of light source that emits visible and/or invisible light. The light source may be, for example, an LED, a laser, or an incandescent, fluorescent or high-intensity discharge light bulb. At least some of the emitted light (104A) is directed to the fiber-optic connector (108). The light emitted by the light source may be focused in a beam (e.g., if the light source is a laser), or it may be non-focused, e.g. the light source may emit light omnidirectionally.

The lens (106), in accordance with one or more embodiments of the invention, focuses the light (104A), emitted by the light source (102). The focused light (104B) may be directed to the fiber end (112) of the optical fiber (110). The lens (106) may reduce the amount of non-focused light that strikes regions surrounding the fiber end rather than the fiber end (112) itself. Those skilled in the art will appreciate that in addition, or alternatively, other optical elements, including mirrors, arrangements including multiple optical elements, etc., may be used to focus the light, emitted by the light source. However, despite the use of the lens (106), light may reach the surface of the fiber-optic connector in the vicinity of the fiber end, for example, due to insufficient focusing of the beam of light (104B), due to misalignment of the fiber end (112), the lens (106), and/or the light source (102), and/or due to misalignment of any other optical component in the optical path. Further, in one or more embodiments of the invention, the lens (106) may not be present.

The fiber-optic connector (108), in accordance with one or more embodiments of the invention, may connect the optical fiber (110) to an interfacing optical component of a fiber-optic system (100). The fiber-optic connector (108) may be a plug that may include a ferrule. As previously described, the ferrule may hold the fiber and may align the fiber for mating with a corresponding optical component. The fiber-optic connector may further include a connector body, covers, seals, etc. which may enclose and protect the ferrule and the optical fiber from environmental influences. In addition, the fiber-optic connector may include a coupling mechanism, i.e., a mechanical component that holds the fiber-optic connector in place when it gets attached to the interfacing optical component. The coupling mechanism may be, for example, a latch clip, a bayonet-style nut, or any other device suitable for mechanically securing the fiber-optic connector. For the sake of clarity, the following discussion of the fiber-optic connector primarily focuses on the ferrule and the optical fiber. Those skilled in the art will nevertheless appreciate that a fiber-optic connector may include additional components, e.g., a connector body, a coupling mechanism, etc., without departing from the invention.

The optical fiber (110), in accordance with one or more embodiments of the invention, is made of transparent glass or plastic and may include a transparent core, surrounded by a transparent cladding material with a lower index of refraction, thus keeping light in the core, and making the fiber act as a waveguide. The optical fiber (110) may be used for the purpose of data and/or energy transmission. Applications include, but are not limited to, data transmission between information technology equipment, the transmission of optically acquired measurements, the transmission of light for illumination purposes, the delivery of high power laser beams, e.g., for welding and cutting applications, etc.

FIGS. 2A-2D show exemplary embodiments of a fiber-optic connector. In the described embodiments, a surface with reduced optical reflectivity surrounds the end of the optical fiber.

Turning to FIG. 2A, the fiber-optic connector (200) may include a ferrule (204), in addition to an optical fiber (202). In one embodiment of the invention, the optical fiber (202) may terminate in a polished fiber end (222B) at the ferrule end face (214). The ferrule (204) may be metallic or ceramic and may be cylinder-shaped. Those skilled in the art will recognize that the ferrule may alternatively be made of other materials and/or may have a non-cylindrical shape. The geometry and material may be selected based on the intended application.

The polished fiber end (222B), in accordance with an embodiment of the invention, is flush with the ferrule end face (214) of the fiber-optic connector. The polished fiber end (222B), in accordance with one or more embodiments of the invention is further surrounded by a surface with a reduced optical reflectivity (206), i.e., a surface that is less optically reflective than the ferrule end face (214). Accordingly, light that, due to, e.g., misalignments and/or insufficient focusing, misses the polished fiber end (222B), may instead reach the surface with reduced optical reflectivity (206). To limit the reflected light to a level, acceptable for a given application, suitable materials and surface structures of the surface with reduced optical reflectivity (206) may be chosen, as further described below. The amount of reflected light may be deemed acceptable, for example, if, in data transmission applications, no data transmission errors are introduced by the interference caused by the reflected light. In optical measurement applications, reflected light may be deemed acceptable if the resulting measurement error is below a certain threshold and/or if the signal to noise ratio is below a certain threshold, etc.

FIG. 2B shows a cross-sectional view of a ferrule (204) in accordance with an embodiment of the invention, prior to assembly of the fiber-optic connector. The ferrule (204) may include a fiber passage (210), providing space to accommodate an optical fiber, to be installed when the fiber-optic connector is assembled. The ferrule (204), in the exemplary embodiment shown in FIG. 2B, is of cylindrical shape, with the fiber passage (210) being centrally located, traversing the ferrule in a longitudinal direction along the rotation axis of the ferrule. The fiber passage (210) may be a cylindrical bore of a diameter sufficiently large to accommodate the optical fiber. The bore may have sections of differing diameters, as shown in FIG. 2B. In a narrower section, the diameter of the fiber passage (210) may be chosen to directly enclose the optical fiber, thus guiding the optical fiber within the ferrule. In one embodiment of the invention, the narrower section of the fiber passage is designed such that the optical fiber exits the ferrule in a central location, perpendicular to the ferrule end face (214). Other sections of the fiber passage (210) may be wider. In these sections the optical fiber is therefore not directly enclosed by the fiber passage. The space between the optical fiber and the walls of the fiber passage may, during assembly of the optical connector, be filled with an adhesive, thus permanently fixating the optical fiber in the ferrule, as further described below.

In one or more embodiments of the invention, the ferrule further includes a recess (212) in the ferrule end face. The recess (212), in accordance with one or more embodiments of the invention, is designed to be filled with a component that is less reflective than the surface of the ferrule. After completion of the manufacturing of the fiber-optic connector, in accordance with an embodiment of the invention, the component occupying the recess (212) may form the surface with reduced reflectivity (206), as shown in FIG. 2A. In one embodiment of the invention, the recess (212) is substantially circular, with the center substantially coinciding with the central axis of the fiber passage (210). The optical fiber may therefore exit the recess (212) in an approximately central location of the recess. In one or more embodiments of the invention, the recess is sufficiently large to cover a region where non-focused light, as previously discussed, may hit an area surrounding the end of the optical fiber. The recess (212), in accordance with one or more embodiments of the invention, may have a depth ranging from a few micrometers to multiple millimeters.

FIG. 2C shows a cross-sectional view of an exemplary embodiment of a partially manufactured fiber-optic connector, in accordance with one embodiment of the invention. An adhesive (220) has been injected into the fiber passage (210) and into the recess (212) of the ferrule (204), and the optical fiber (202) has been inserted into the fiber passage (210). A quantity of adhesive, sufficiently large to fill the fiber passage (210) and the recess (212), after insertion of the optical fiber (202), may have been injected. The adhesive may be, for example, an epoxy, a silicone, or any other type of adhesive capable of bonding with the optical fiber (202) and the ferrule (204). In one or more embodiments of the invention, the adhesive (220) in the recess (212), once the manufacturing of the fiber-optic connector is complete, forms the surface with reduced reflectivity (206), shown in FIG. 2A. Accordingly, the choice of an adhesive may be influenced by the optical reflectivity characteristics of the adhesive. The adhesive may have an optical reflectivity such that the light reflected by the surface with limited reflectivity (206), formed by the adhesive, is limited to a level, acceptable for a given intended application. In one embodiment of the invention, pigment may be added to the adhesive in order to further reduce the optical reflectivity of the adhesive.

Continuing the discussion of the partially assembled fiber-optic connector, shown in FIG. 2C, the optical fiber (202) may have been inserted through the fiber passage (210) to extend beyond the ferrule end face (214) of the ferrule, terminating in the unpolished end of the fiber (222A).

In an alternative embodiment (not shown), the recess may accommodate an insert made of a material with limited reflectivity. The insert may be, for example, donut-shaped, with the center of the donut providing sufficient space to accommodate the optical fiber. In one embodiment of the invention, the donut-shaped insert snuggly encloses the optical fiber. The insert may be made of a material, e.g. plastic, with sufficiently low optical reflectivity to limit the reflected light to a level, acceptable for a given intended application.

FIG. 2D shows a cross-sectional view of an exemplary embodiment of an assembled fiber-optic connector. After polishing of the unpolished fiber end (222A), shown in FIG. 2C, the resulting polished fiber end (222B) is flush with the ferrule end face (214). As a result of the polishing, the adhesive (220), previously protruding beyond the ferrule end face (214) (as shown in FIG. 2C), may be removed, thus establishing a single leveled surface including the polished fiber end (222B) in the center, the surface with reduced optical reflectivity (206), surrounding the polished fiber end, and the ferrule end face (214). The polishing may further also result in polishing of the ferrule end face (214).

The polishing reduces the loss of light due to surface irregularities at the optical interface formed by the fiber end, thus enabling an efficient transmission of light into and out of the fiber. The surface with reduced optical reflectivity (206) may be sufficiently non-reflective, to reflect only a limited, acceptable amount of light, in case of the previously described optical misalignment and/or insufficiently focused light. In comparison to a polished metal ferrule end face which may have a high optical reflectivity (e.g., 80%), the surface with reduced optical reflectivity may be minimally optically reflective. For example, in case of an epoxy with added black pigment forming the surface with reduced optical reflectivity, the optical reflectivity may be reduced to 0.5%.

Figure 3:
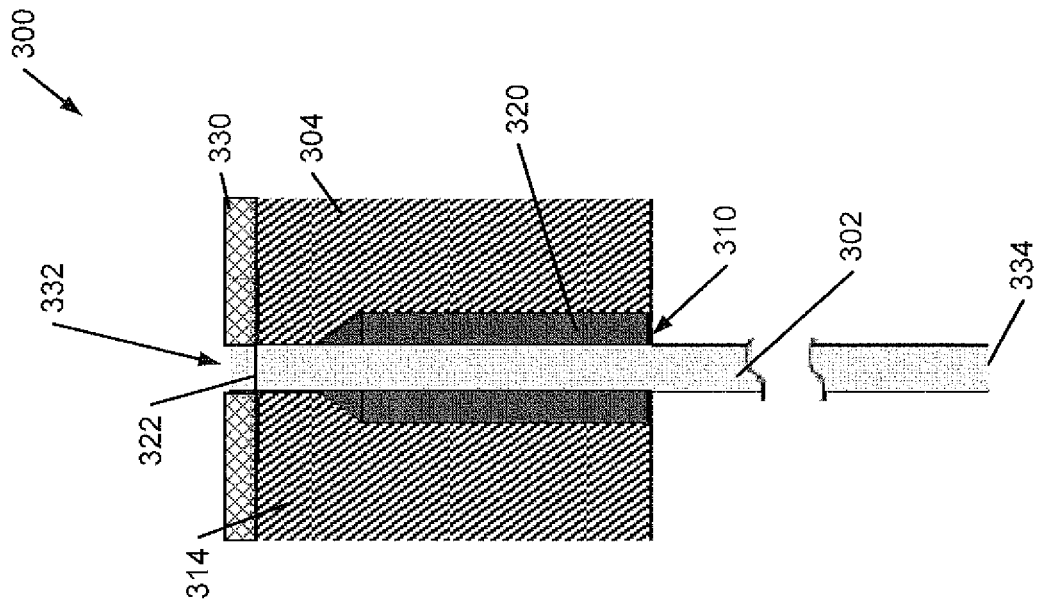
FIG. 3 shows a cross-sectional view of a fiber-optic connector in accordance with one or more embodiments of the invention.

FIG. 3 shows an alternative exemplary embodiment of a fiber-optic connector, where a coating is applied to the ferrule end face, and where the coating has an optical reflectivity less than the optical reflectivity of the ferrule end face.

Turning to FIG. 3, the fiber-optic connector (300), includes a ferrule (304) and an optical fiber (302), traversing the ferrule in the fiber passage (310), fixated by the adhesive (320). In accordance with an embodiment of the invention, the fiber-optic connector further includes a coating with reduced reflectivity (330), applied to the ferrule end face (314), i.e., a coating that is less optically reflective than the ferrule end face (314). The coating with reduced reflectivity (330) may be applied to the entire ferrule (304), to the end face (314) of the ferrule, or only to a limited area of the ferrule end face (314), surrounding the polished fiber end (322). In one embodiment of the invention, at least a region surrounding the polished fiber end (322), sufficiently large to accommodate any realistically occurring degree of misalignment and/or insufficiently focused light, as previously described, is coated.

In one embodiment of the invention, the coating with reduced reflectivity (330) may be applied to the ferrule (304) in a manufacturing process, further described below, with reference to FIG. 6. The coating, once applied to the ferrule, may cure to become the coating with reduced reflectivity (330). In one embodiment of the invention, the coating is a photosensitive dye that, upon exposure to light, in presence of a photo developer agent, dissolves. The photosensitive dye may be, for example, a photoresist, used, for example, in photolithography. More specifically, the photosensitive dye may be a positive photoresist, i.e., a resist in which the portion of the photoresist that is exposed to light becomes soluble to the photo developer agent. In one embodiment of the invention, the photoresist itself is antireflective. Alternatively, pigment may be added to the photoresist in order to further reduce optical reflectivity.

In one embodiment of the invention, prior to applying the coating with reduced reflectivity, the optical fiber (302), has been installed in the fiber passage (310), and the fiber end at the ferrule end face (314) has been polished as previously described with reference to the embodiment shown in FIGS. 2A-D, and as described below with reference to the figures discussing methods for manufacturing the fiber-optic connector.

The photosensitive dye, when applied to the ferrule end face (314), may also cover the polished fiber end (322). Subsequently light may be applied from a second end of the optical fiber (334). The light may have a particular wavelength. For example, a photoresist may require the use of ultraviolet light. The light may exit the polished fiber end (322) thus reaching the photosensitive coating (330) blocking the polished fiber end (322). In presence of the photo developer agent, the photosensitive coating that is or has been exposed to the light may dissolve, thereby establishing a window (332), enabling the receipt and/or emission of light via the polished fiber end (322), while providing the coating with reduced optical reflectivity in the surrounding area.

In another alternative embodiment of the invention, where the ferrule is made of a conductive material, the coating with reduced reflectivity (330), shown in FIG. 3 may be a metal coating, applied using electroplating. The metal, deposited during the electroplating process, may be, for example, tin, zinc, copper, nickel, lead, etc. The ferrule end face (314) or the entire ferrule (304) may be electroplated. Because the polished fiber end (322) is non-conductive, no metal may be deposited in the area of the polished fiber end (322), thus leaving a window (332) in the metal coating.

Figure 4:
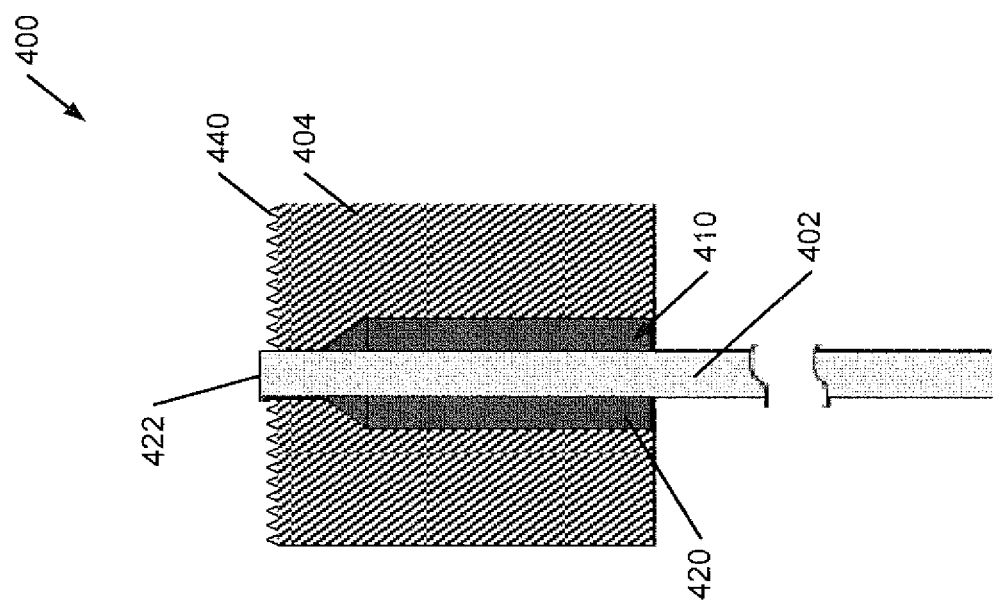
FIG. 4 shows a cross-sectional view of a fiber-optic connector in accordance with one or more embodiments of the invention.

FIG. 4 shows an alternative exemplary embodiment of a fiber-optic connector, where the ferrule end face is etched. The resulting etched surface may have a surface structure that scatters light, thus reducing the optical reflectivity in comparison to the polished ferrule end face, prior to the etching.

Turning to FIG. 4, the fiber-optic connector (400), includes a ferrule (404) and an optical fiber (402), traversing the ferrule in the fiber passage (410), fixated by the adhesive (420). In accordance with an embodiment of the invention, the fiber-optic connector further includes the etched surface (440). The etched surface may be limited to an area surrounding the polished fiber end (422). Alternatively, the entire surface of the ferrule (404) may be etched. In one embodiment of the invention, a region surrounding the polished fiber end (422), sufficiently large to accommodate any realistically occurring degree of misalignment and/or insufficiently focused light is etched.

The etching, in accordance with an embodiment of the invention, may be achieved using an etching agent, e.g., an acid. The etching agent may be selected such that it etches the surface of the ferrule, but not the optical fiber. Consider, for example a ferrule made of steel, and an optical fiber made of glass. Etching agents that may be used in this scenario include, but are not limited to, hydrochloric acid, nitric acid and sulfuric acid. Alternatively, other etching agents, such as ferric chloride, copper sulfate, etc. may also be used. One skilled in the art will appreciate that the choice of an etching agent is not limited to these examples. Rather, any etching agent, suitable for etching the surface of the ferrule, while not attacking the polished fiber end, may be used.

One skilled in the art will recognize that fiber-optic connectors in accordance with one or more embodiments of the invention are not limited to the exemplary embodiments shown in FIGS. 2A-4. For example, fiber-optic connectors may include additional parts such as connector bodies, coupling mechanisms, and/or other elements that may protect the fiber-optic connection and/or that may facilitate the handling of the fiber-optic connector. Further, the shapes and dimensions of components of the fiber-optic connector may vary. For example, the ferrule may not necessarily be cylindrical, the diameter of the fiber passage may be variable, etc. Also, even though the recess shown in FIGS. 2B-2D is described as cylindrical, the recess may have any other shape, as required by the application or desired by the manufacturer and/or by the user of the fiber-optic connector. Fiber-optic connectors may also be designed to accommodate not only a single optical fiber, but multiple optical fibers, without departing from the invention.

Figure 5:
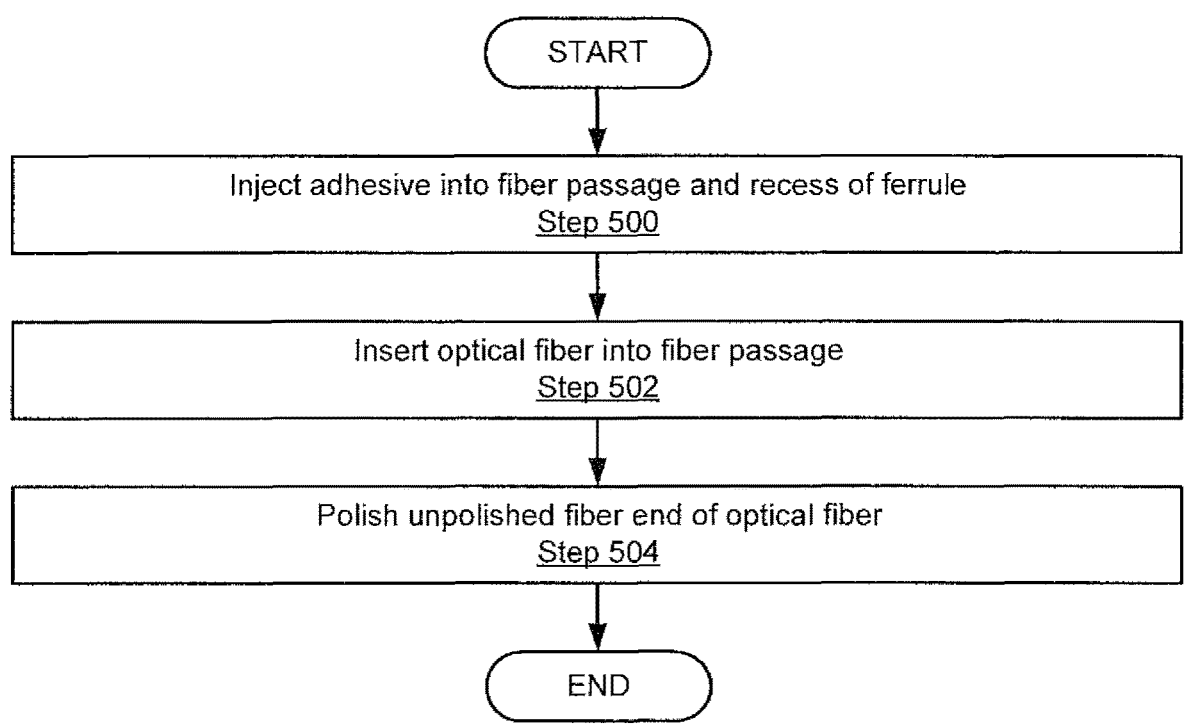
FIGS. 5-7 show flowcharts describing methods for manufacturing fiber-optic connectors, in accordance with one or more embodiments of the invention.
Figure 6:
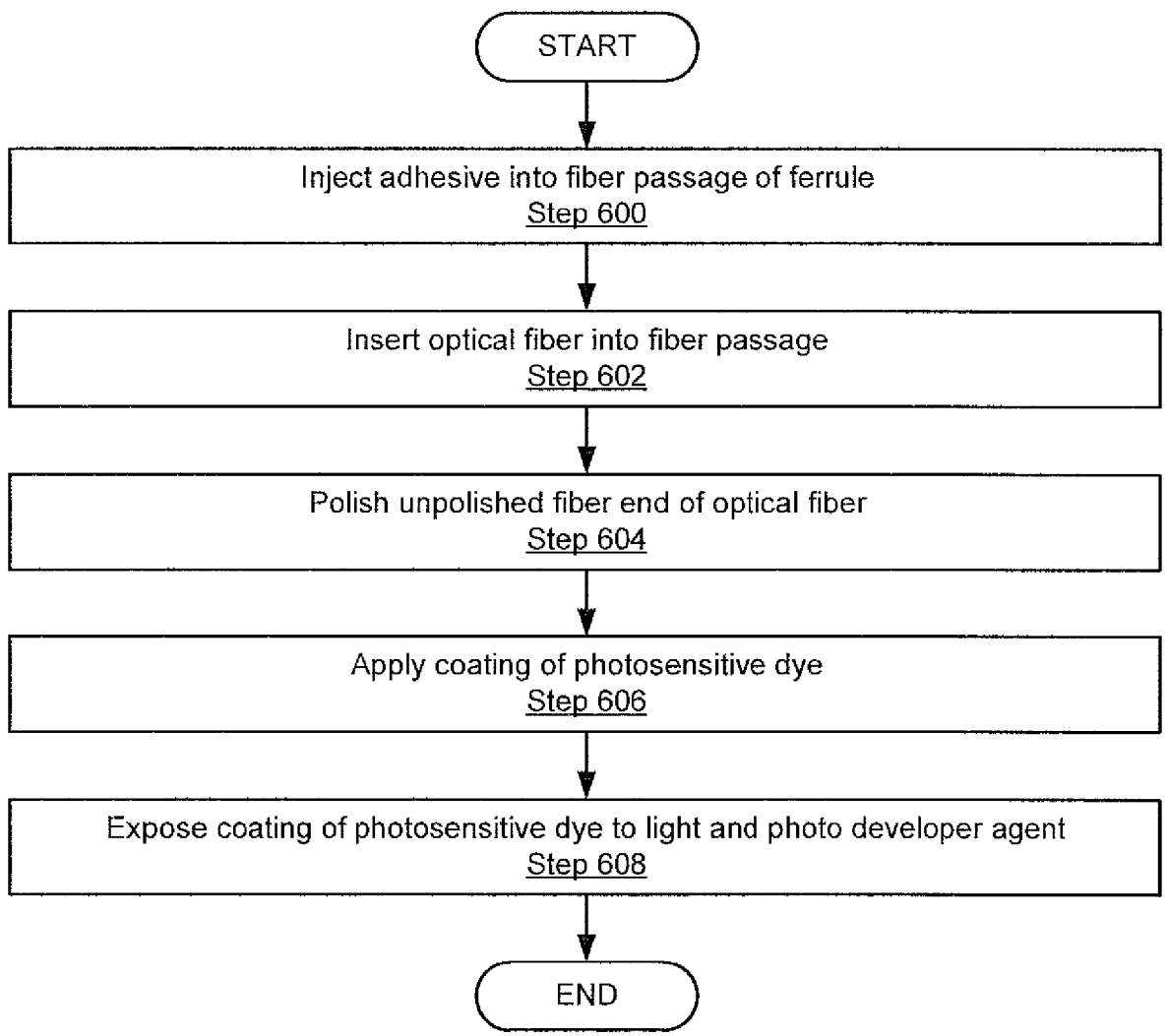
Figure 7:
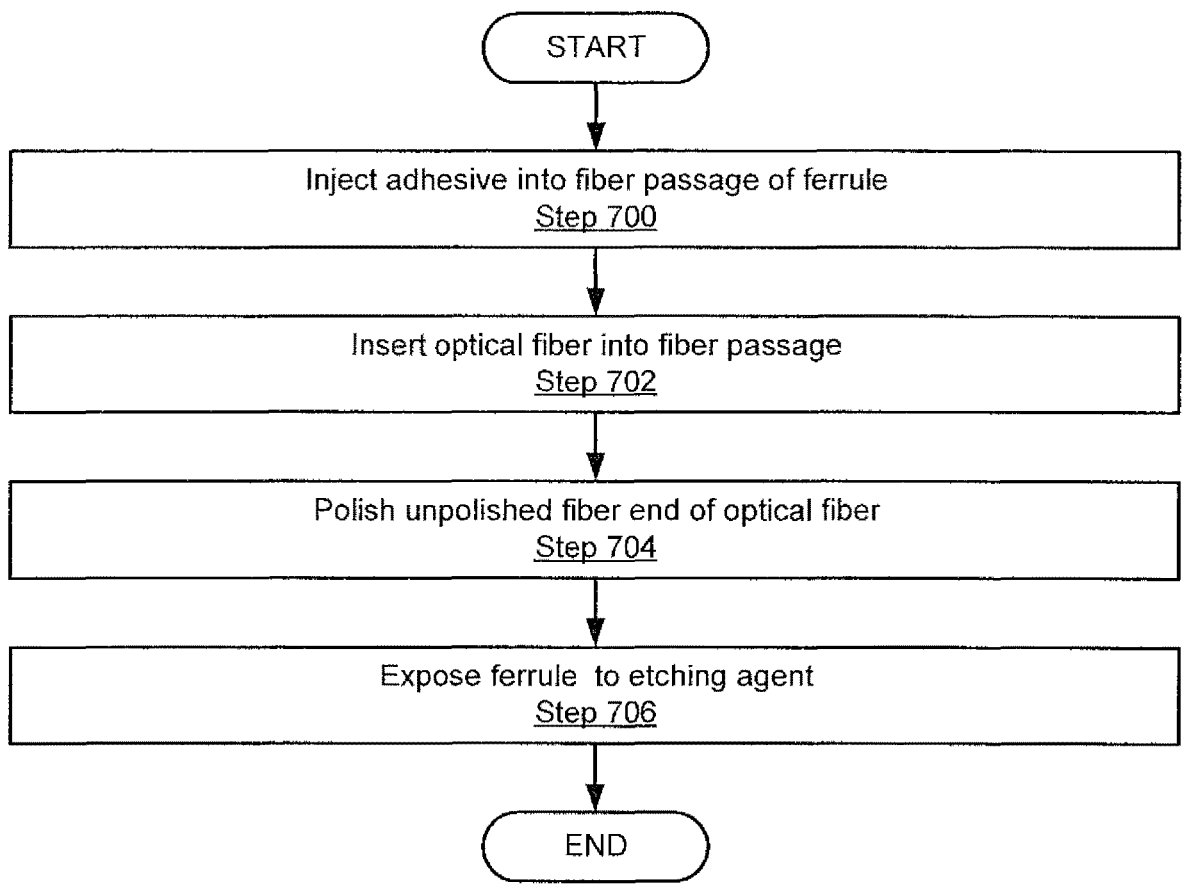

FIGS. 5-7 show flowcharts, describing methods for manufacturing fiber-optic connectors, as shown in FIGS. 2A-4, in accordance with one or more embodiments of the invention. While the various manufacturing steps in the flowcharts are presented and described sequentially, one of ordinary skill will appreciate that some of these manufacturing steps may be executed in different orders, may be combined or omitted, and some of the manufacturing steps may be executed in parallel, without departing from the invention. The manufacturing may be performed manually or in an automated manner, for example, if larger quantities of fiber-optic connectors are produced.

FIG. 5 shows a flowchart, describing the manufacturing of a fiber-optic connector, as shown in FIGS. 2A-2D, in accordance with one or more embodiments of the invention.

Turning to FIG. 5, in Step 500, an adhesive is injected into the fiber passage and the recess of the ferrule. The adhesive may be injected, for example, via a cannula or nozzle. Alternatively, the ferrule may be immersed into the adhesive in order to have the adhesive enter the fiber passage and the recess. Previously described FIG. 2B shows the ferrule prior to injection of the adhesive, whereas FIG. 2C shows the ferrule after injection of the adhesive, and after insertion of the optical fiber.

In Step 502, the optical fiber is inserted into the fiber passage before the adhesive has cured. In one embodiment of the invention, the optical fiber may be fed through the fiber passage of the ferrule, to protrude beyond the ferrule end face. Due to the insertion of the optical fiber into the fiber passage, a volume of adhesive may be displaced and may accumulate in the region of the ferrule end face. FIG. 2C shows the ferrule after insertion of the optical fiber. In one embodiment of the invention, the combination of the ferrule, the optical fiber and the adhesive may be externally supported, for example in a jig used during the assembly, until the adhesive has cured, thus providing sufficient mechanical support to fixate the optical fiber within the ferrule.

In Step 504, the unpolished fiber end of the optical fiber is polished. In one or more embodiments of the invention, the polishing of the fiber end may be performed to a degree such that the resulting polished fiber end is flush with the ferrule end face. Polishing may be performed using, for example, polishing film and/or polishing paper. The ferrule end face with the unpolished fiber end may face the polishing film/paper, with the unpolished fiber end being in contact with the polishing film/paper, as the fiber-optic connector is moved along the polishing film/paper in sliding movements, until the fiber end is sufficiently polished. Those skilled in the art will recognize that other methods for polishing the fiber end may be used in addition or alternatively. Additional steps may be performed prior to polishing the fiber. The optical fiber may, for example, be trimmed to shorten an excessively long optical fiber, prior to polishing.

In one embodiment of the invention, the polishing also removes excessive adhesive, protruding beyond the ferrule end face, in the area surrounding the fiber end, thus leveling the adhesive with the ferrule end face. The polishing may, in addition, polish the ferrule end face. As a result of the polishing, the optical reflectivity of the ferrule end face may be high. However, the polishing, in accordance with an embodiment of the invention, does not result in an unacceptably high optical reflectivity of the surface with reduced optical reflectivity (i.e., the polished surface of the adhesive), surrounding the polished fiber end. Accordingly, after completion of the above described manufacturing steps, the resulting fiber-optic connector, even in case of optical misalignments and/or insufficient focusing of the light, may only reflect an amount of light that is acceptable for a given intended application.

In an embodiment of the invention where an insert (e.g. a donut-shaped insert) is placed into the recess, as previously described, the insert may be installed in either Step 500 or in Step 502, or alternatively, prior to Step 500. Otherwise the manufacturing steps, as previously described, may be applicable.

FIG. 6 shows a flowchart, describing the manufacturing of a fiber-optic connector, as shown in FIG. 3, in accordance with one or more embodiments of the invention.

Turning to FIG. 6, in Step 600, an adhesive is injected into the fiber passage of the ferrule. The adhesive may be injected, for example, via a cannula or nozzle. Alternatively, the ferrule may be immersed into the adhesive in order to have the adhesive enter the fiber passage.

In Step 602, the optical fiber is inserted into the fiber passage before the adhesive has cured. In one embodiment of the invention, the fiber may be fed through the fiber passage of the ferrule to protrude beyond the ferrule end face. Due to the insertion of the optical fiber into the fiber passage, a volume of adhesive may be displaced and may accumulate in the region of the ferrule end face. In one embodiment of the invention, the combination of the ferrule, the optical fiber and the adhesive may be externally supported, for example in a jig used during the assembly, until the adhesive has cured, thus providing sufficient mechanical support to fixate the optical fiber within the ferrule.

In Step 604, the unpolished fiber end of the optical fiber is polished. In one or more embodiments of the invention, the polishing of the fiber end may be performed to a degree such that the resulting polished fiber end is flush with the ferrule end face. Polishing may be performed using, for example, polishing film and/or polishing paper. The ferrule end face with the unpolished fiber end may face the polishing film/paper, with the unpolished fiber end being in contact with the polishing film/paper, as the fiber-optic connector is moved along the polishing film/paper in sliding movements, until the fiber end is sufficiently polished. Those skilled in the art will recognize that other methods for polishing the fiber end may be used in addition or alternatively. Additional steps may be performed prior to polishing the fiber. The optical fiber may, for example, be trimmed to shorten an excessively long optical fiber, prior to polishing.

In one embodiment of the invention, the polishing also removes excessive adhesive, protruding beyond the ferrule end face, in the area surrounding the fiber end. The polishing may, in addition, polish the ferrule end face. As a result of the polishing, the optical reflectivity of the ferrule end face may be high.

In Step 606, a coating of a photosensitive dye is applied to the ferrule end face or to the entire ferrule. The photosensitive coating may establish a surface with reduced optical reflectivity. In one embodiment of the invention, the photosensitive dye may be applied to the ferrule, for example, by dipping the ferrule into the liquid photosensitive dye. Only the ferrule end face or the entire ferrule may be immersed into the liquid photosensitive dye. Alternatively, the coating may be sprayed on, may be applied using a paint brush, etc. After application of the coating, the coating may be allowed to cure.

As previously described, the photosensitive dye may be, for example, a positive photoresist, i.e., a resist in which the portion of the photoresist that is/was exposed to light becomes soluble to a photo developer agent.

In Step 608, the photosensitive coating, in the area of the polished fiber end, is exposed to light and the photo developer agent, in order to remove the photosensitive coating in the area of the polished fiber end. Light may be applied from a second end of the optical fiber. Accordingly, only the region of the photosensitive coating in an immediate vicinity to the polished fiber end (i.e., in the area where the photosensitive coating, applied in Step 606, covers the polished fiber end) may be exposed to the light. The light may have a particular wavelength. For example, a photoresist may require the use of ultraviolet light. In presence of the photo developer agent, the photosensitive coating, being or having been exposed to the light, may dissolve, thereby establishing a window in the photosensitive coating, thus enabling the receipt and/or emission of light via the polished fiber end, while leaving the surrounding photosensitive coating intact.

Accordingly, after completion of the above described manufacturing steps, the resulting fiber-optic connector, even in case of optical misalignments and/or insufficient focusing of the light, may only reflect an amount of light that is acceptable for a given intended application.

In an embodiment of the invention where the ferrule is electroplated, the electroplating may be performed in lieu of Steps 606 and 608. The ferrule end face or the entire ferrule may be electroplated. Various methods for electroplating and various metals to be deposited using electroplating exist. Any method and any metal that may establish a surface of reduced optical reflectivity may be used.

FIG. 7 shows a flowchart, describing the manufacturing of a fiber-optic connector, as shown in FIG. 4, in accordance with one or more embodiments of the invention.

Turning to FIG. 7, in Step 700, an adhesive is injected into the fiber passage of the ferrule. The adhesive may be injected, for example, via a cannula or nozzle. Alternatively, the ferrule may be immersed into the adhesive in order to have the adhesive enter the fiber passage.

In Step 702, the optical fiber is inserted into the fiber passage before the adhesive has cured. In one embodiment of the invention, the fiber may be fed through the fiber passage of the ferrule to protrude beyond the ferrule end face. Due to the insertion of the optical fiber into the fiber passage, a volume of adhesive may be displaced and may accumulate in the region of the ferrule end face. In one embodiment of the invention, the combination of the ferrule, the optical fiber and the adhesive may be externally supported, for example in a jig used during the assembly, until the adhesive has cured, thus providing sufficient mechanical support to fixate the optical fiber within the ferrule.

In Step 704, the unpolished fiber end of the optical fiber is polished. In one or more embodiments of the invention, the polishing of the fiber end may be performed to a degree such that the resulting polished fiber end is flush with the ferrule end face. Polishing may be performed using, for example, polishing film and/or polishing paper. The ferrule end face with the unpolished fiber end may face the polishing film/paper, with the unpolished fiber end being in contact with the polishing film/paper, as the fiber-optic connector is moved along the polishing film/paper in sliding movements, until the fiber end is sufficiently polished. Those skilled in the art will recognize that other methods for polishing the fiber end may be used in addition or alternatively. Additional steps may be performed prior to polishing the fiber. The optical fiber may, for example, be trimmed to shorten an excessively long optical fiber, prior to polishing.

In one embodiment of the invention, the polishing also removes excessive adhesive, protruding beyond the ferrule end face, in the area surrounding the fiber end. The polishing may, in addition, polish the ferrule end face. As a result of the polishing, the optical reflectivity of the ferrule end face may be high.

In Step 706, the ferrule is exposed to an etching agent. Only the ferrule end face or the entire ferrule may be exposed to the etching agent. The ferrule may, for example, be dipped into a bath with the etching agent. The etching agent, may attack the surface of the ferrule, but not the optical fiber, thus causing an irregular ferrule end face that scatters rather than reflects light. The duration of the exposure to the etching agent may be controlled in order to obtain the desired surface characteristics.

Accordingly, after completion of the above described manufacturing steps, the resulting fiber-optic connector, even in case of optical misalignments and/or insufficient focusing of the light, may only reflect an amount of light that is acceptable for a given intended application.

Embodiments of the invention may enable fiber-optic connectors to receive light, while reducing the back-reflection of light toward an interfacing optical component, even in case of improperly focused light, or in case of improper optical alignment.

Optical connectors in accordance with one or more embodiments of the invention, may be compatible with current and future optical connector standards. The optical connectors, in accordance with one or more embodiments of the invention, may be usable in a broad range of applications including applications involving the optical transmission of data and/or energy.

Optical connectors in accordance with one or more embodiments of the invention may be manufactured in a cost effective manner, by reducing the reflectivity of surfaces without requiring tedious localized modifications in the vicinity of the optical fiber end. Further, the manufacturing processes, in accordance with one or more embodiments of the invention, are suitable for both manual and automated execution, thus enabling low cost manufacturing of large numbers of fiber-optic connectors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A fiber-optic connector that reduces reflections of incident light, the fiber-optic connector comprising:
    a ferrule including a bore hole that forms a fiber passage through the ferrule to a ferrule end face;
    an optical fiber including:
        a polished fiber end that is flush with a surface defined by the ferrule end face; and
        a core and a cladding that traverse the fiber passage and that are exposed at the flush surface;
    an adhesive disposed within the fiber passage that fixes the optical fiber by directly binding an outer surface of the cladding to the fiber passage; and
    a coating, disposed on only on a limited area of the ferrule end face, that includes a window, wherein the coating surrounds and is adjacent to the bore hole and the polished fiber end and has lower optical reflectivity than the ferrule end face, such that the core and the cladding of the polished fiber end are uncovered and unmodified, wherein
    when an area of the ferrule end face larger than the bore hole is illuminated by the incident light, the coating reduces a reflected signal from the ferrule end face.

2. The fiber-optic connector of claim 1, wherein
    the coating is a photosensitive dye, and
    the window is generated by exposing the photosensitive dye in the region of the polished fiber end to light, injected from a second fiber end of the optical fiber.

3. The fiber-optic connector of claim 2, wherein
    the photosensitive dye is a positive photoresist, and
    the window is generated by dissolving the exposed photosensitive dye with a photo developer agent.

4. The fiber-optic connector of claim 1, wherein the coating includes a pigment that reduces the optical reflectivity of the coating.

5. The fiber-optic connector of claim 1, wherein
    the ferrule is electrically conductive, and
    the coating is an electroplated metal.

* * * * *